US010452895B1

(12) United States Patent
Tang et al.

(10) Patent No.: US 10,452,895 B1
(45) Date of Patent: Oct. 22, 2019

(54) FACE SENSING MODULE AND COMPUTING DEVICE USING SAME

(71) Applicant: HON HAI PRECISION INDUSTRY CO., LTD., New Taipei (TW)

(72) Inventors: Hsueh-Yung Tang, Taoyuan (TW); Chen-Kuang Yeh, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/003,030

(22) Filed: Jun. 7, 2018

(30) Foreign Application Priority Data

Apr. 10, 2018 (TW) .............................. 107112341 A

(51) Int. Cl.
*G06K 9/00* (2006.01)
*H04N 5/225* (2006.01)
*H04N 5/33* (2006.01)

(52) U.S. Cl.
CPC ..... *G06K 9/00255* (2013.01); *G06K 9/00288* (2013.01); *H04N 5/2252* (2013.01); *H04N 5/2253* (2013.01); *H04N 5/2258* (2013.01); *H04N 5/33* (2013.01)

(58) Field of Classification Search
CPC ........... G06K 9/00255; G06K 9/00288; H04N 5/2253; H04N 5/33; H04N 5/2252; H04N 5/2258
USPC .......................................................... 348/77
See application file for complete search history.

(56) References Cited

U.S. PATENT DOCUMENTS

| 2006/0102843 | A1* | 5/2006 | Bazakos | G06K 9/00255 |
| | | | | 250/339.05 |
| 2011/0084893 | A1 | 4/2011 | Lee et al. | |
| 2014/0192158 | A1* | 7/2014 | Whyte | G06K 9/6201 |
| | | | | 348/46 |
| 2016/0307032 | A1* | 10/2016 | Butler | G06K 9/00208 |
| 2017/0199997 | A1* | 7/2017 | Fadell | G06F 21/316 |
| 2019/0101377 | A1* | 4/2019 | White | G01B 11/14 |

FOREIGN PATENT DOCUMENTS

| CN | 201699888 U | 1/2011 |
| TW | M532588 U | 11/2016 |
| TW | M532699 U | 11/2016 |
| TW | M550941 U | 10/2017 |
| TW | M553428 U | 12/2017 |

* cited by examiner

*Primary Examiner* — Marnie A Matt
(74) *Attorney, Agent, or Firm* — ScienBiziP, P.C.

(57) ABSTRACT

A face sensing module for a computing device includes a frame, a depth sensor, and an RGB camera. The frame includes first and second side portions and a cross portion. The depth sensor includes first and second infrared cameras, and an infrared light emitting unit. The first infrared camera is mounted on the first side portion. The second infrared camera is mounted on the second side portion. The infrared light emitting unit is mounted on the cross portion, with an infrared emitter and an infrared guide. Infrared light emitted is guided out. The RGB camera is mounted on the first side portion. The first and second infrared cameras and the RGB camera are optically aligned before being mounted together inside the housing of the computing device to ensure precise mountings and the durability of precise alignment notwithstanding handling by a user.

20 Claims, 5 Drawing Sheets

FACE SENSING MODULE AND COMPUTING DEVICE USING SAME

FIELD

The present disclosure relates to facial recognition technology.

BACKGROUND

A computing device, such as a smart phone, with facial recognition includes a housing, a depth sensor, and an RGB camera. The depth sensor and the RGB camera are mounted inside the housing and at the top front of the computing device to facilitate face recognition when a user looks at the computing device. The depth sensor captures data as to depth of the user's face, and the RGB camera is configured to capture data as to color of the user's face. The depth sensor includes two infrared cameras. The infrared cameras and the RGB camera need to be optically aligned inside the housing. However, optical alignment of the infrared cameras and the RGB camera is often difficult. Additionally, the infrared cameras and the RGB camera may become misaligned due to handling and other everyday forces applied to the computing device.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1A:
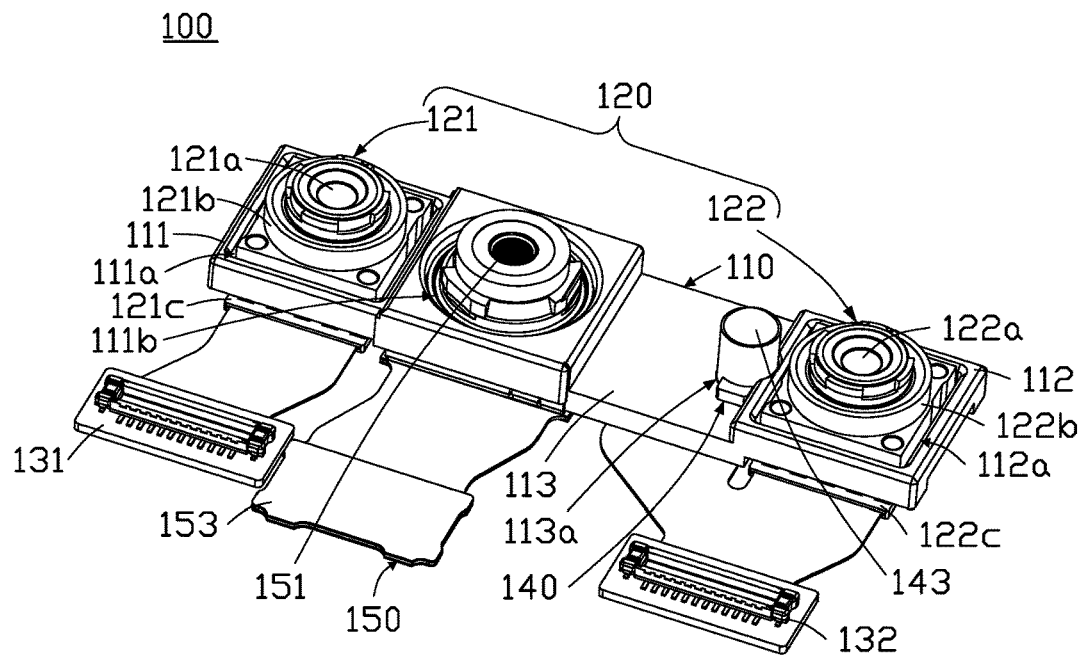
FIG. 1A is a top perspective view of an embodiment of a face sensing module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Figure 1B:
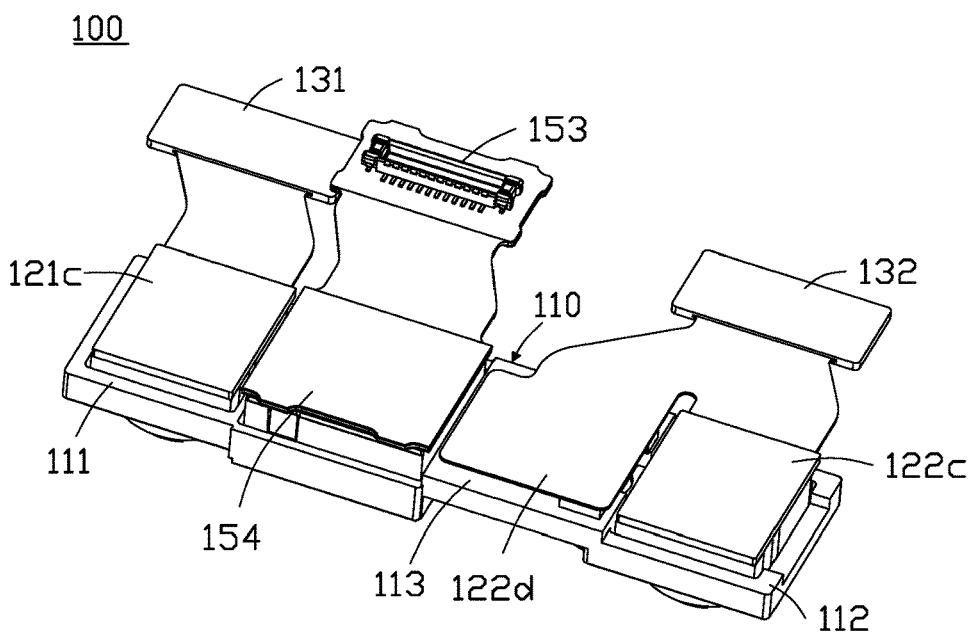
FIG. 1B is a bottom perspective view of the face sensing module of FIG. 1A.
Figure 2:
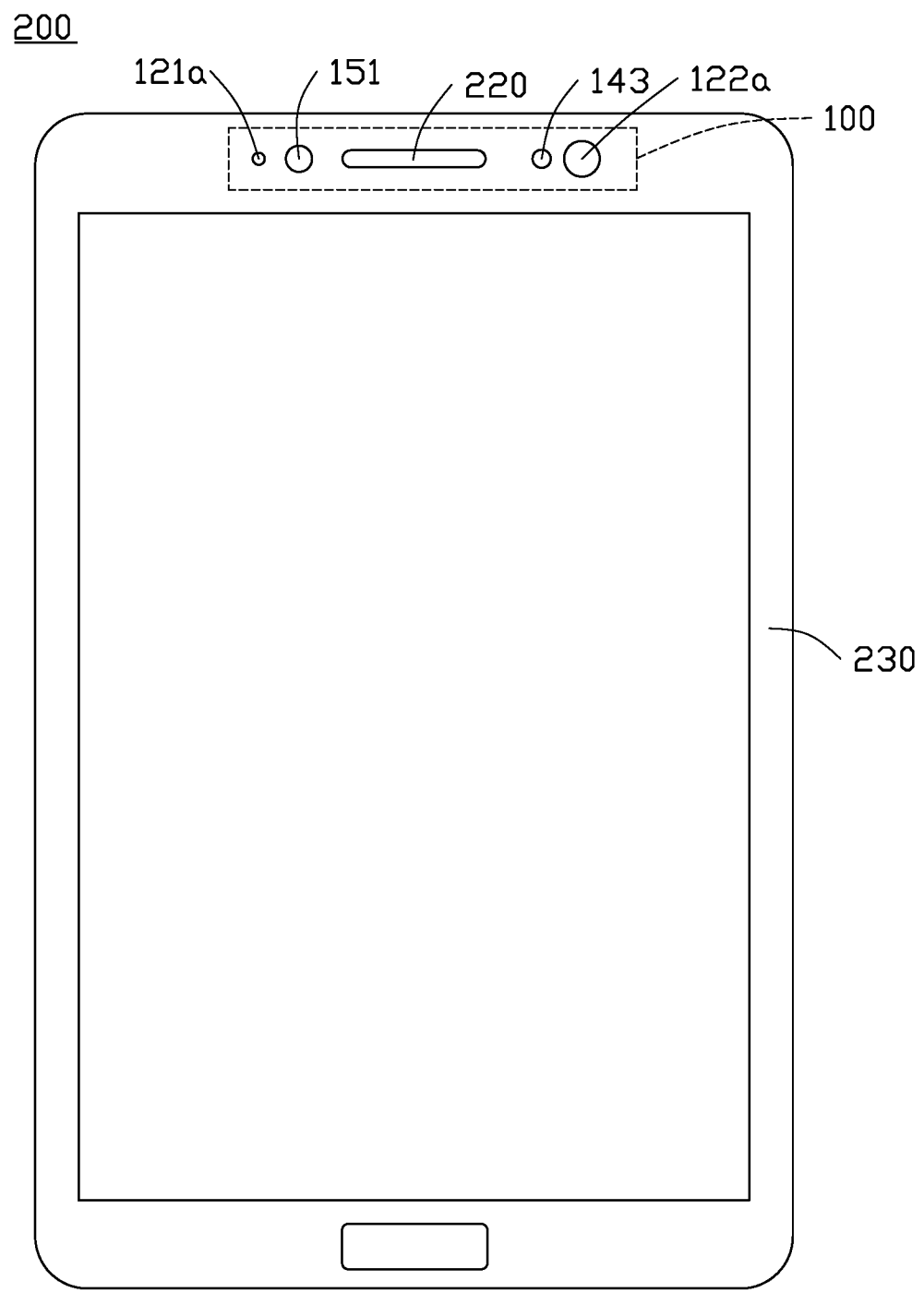
FIG. 2 is a schematic front view of an embodiment of a computing device including the face sensing module of FIG. 1A.

In FIGS. 1A-2, a computing device 200 includes a housing 230, a speaker 220, and a face sensing module 100. The computing device 200 may include more or less components than as described. The computing device 200 may be a smart phone, tablet, laptop, or other device. In the present embodiment, the computing device 200 is a smart phone. The face sensing module 100, adjacent to the speaker 220, is mounted inside the housing 230 for face recognition when a user looks at the computing device 200.

Figure 3A:
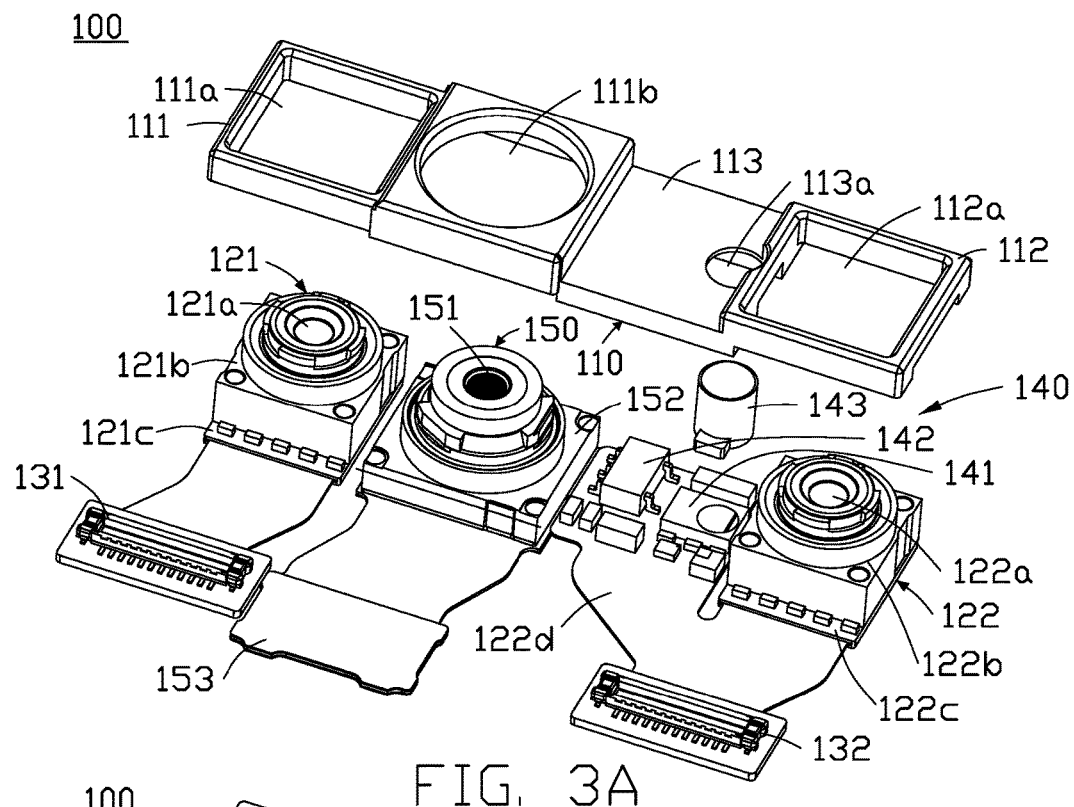
FIG. 3A is a top perspective exploded view of the face sensing module of FIG. 1A.
Figure 3B:
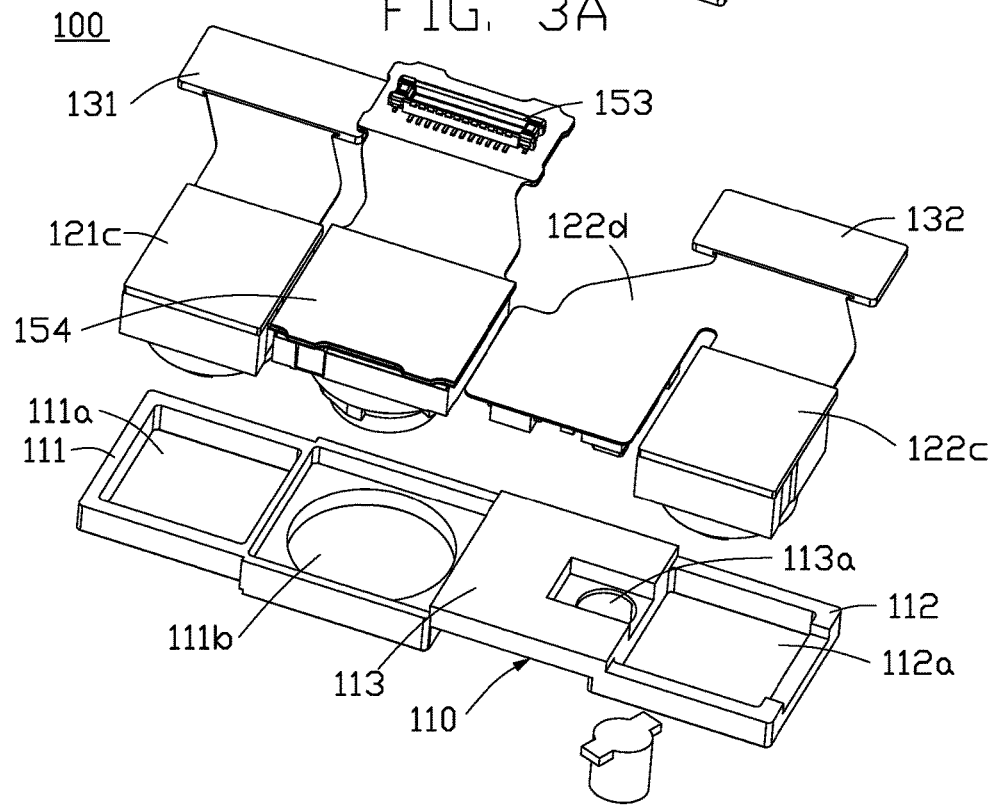
FIG. 3B is a bottom perspective exploded view of the face sensing module of FIG. 1A.

With reference to FIGS. 3A-3B, the face sensing module 100 includes a frame 110, a depth sensor 120, and an RGB camera unit 150. The depth sensor 120 and the RGB camera unit 150 are secured to the frame 110 as a modular structure.

The frame 110 is made of a rigid material, such as metal or hard plastic, that is resistant to deformation. The frame 110 includes a first side portion 111, a second side portion 112, and a cross portion 113. The cross portion 113 is connected between the first side portion 111 and the second side portion 112. The first side portion 111, the cross portion 113, and the second side portion 112 are positioned in a straight line. The first side portion 111 has a first infrared camera receiving opening 111a and an RGB camera receiving opening 111b. The second side portion 112 has a second infrared camera receiving opening 112a. The cross portion 113 has a light opening 113a. The cross portion 113 is recessed for receiving the speaker 220 or other components inside the housing 230.

The depth sensor 120 captures data on the depth of the user's face. The depth sensor 120 includes a first infrared camera unit 121, a second infrared camera unit 122, and an infrared light emitting unit 140.

The first infrared camera unit 121 is mounted on the first side portion 111 of the frame 110. The first infrared camera unit 121 includes a first camera mount 121b, a first infrared camera 121a, a first circuit board 121c, and a first connector 131. The first camera mount 121b is received in the first infrared camera receiving opening 111a of the first side portion 111. The first infrared camera 121a is secured to the first camera mount 121b. The first circuit board 121c connects the first infrared camera 121a to the first connector 131. The first connector 131 is located outside of the first side portion 111. The first infrared camera 121a is electrically connected to components inside the housing 230, through the first connector 131.

The second infrared camera unit 122 is mounted on the second side portion 112 of the frame 110. The second infrared camera unit 122 includes a second camera mount 122b, a second infrared camera 122a, a second circuit board 122c, and a second connector 132. The second camera mount 122b is received in the second infrared camera receiving opening 112a of the second side portion 112. The second infrared camera 122a is secured to the second camera mount 122b. The second circuit board 122c connects the second infrared camera 122a to the second connector 132. The second connector 132 is located outside of the second side portion 112. The second infrared camera 122a is electrically connected to components inside the housing 230, through the second connector 132.

The infrared light emitting unit 140 is mounted on the cross portion 113 of the frame 110. The infrared light emitting unit 140 includes an infrared emitter 141, an infrared controller 142, and an infrared guide 143. The infrared emitter 141 and the infrared controller 142 are coupled to a side portion 122d of the second circuit board 122c, and are located under the cross portion 113. The infrared emitter 141 corresponds to the light opening 113a of the cross portion 113. The infrared emitter 141 is an LED device. The infrared controller 142 is configured to control the infrared emitter 141. The infrared guide 143 is mounted over the cross portion 113, and covers the light opening 113a of the cross portion 113. Infrared light emitted by the infrared emitter 141 is emitted outside of the housing 230 through the infrared guide 143. The infrared guide 143 is columnar, and is made of a transparent and flexible material. The infrared guide 143 can be bent inside the housing 230 to guide the infrared light emitted by the infrared emitter 141 to a specific portion of the housing 230 according to the design of the computing device 200. Preferably, the infrared guide 143 is a silicone stick.

The RGB camera unit 150 is mounted on the first side portion 111 of the frame 110. The RGB camera unit 150 is configured to capture data as to color of the user's face. The RGB camera unit 150 includes a third camera mount 152, an RGB camera 151, a third circuit board 154, and a third connector 153. The third camera mount 152 is received in the RGB camera receiving opening 111b of the first side portion 111. The RGB camera 151 is secured to the third camera mount 152. The third circuit board 154 connects the RGB camera 151 to the third connector 153. The third connector 153 is located outside of the first side portion 111. The RGB camera 151 is electrically connected to components inside the housing 230, through the third connector 153.

The first infrared camera 121a, the second infrared camera 122a, and the RGB camera 151 can be optically aligned together after being mounted on the frame 110 and before being mounted inside the housing 230. Optical alignment of the first infrared camera 121a, the second infrared camera 122a, and the RGB camera 151 outside of the housing 230 is thus easier. Additionally, the frame 110 holds the first infrared camera 121a, the second infrared camera 122a, and the RGB camera 151 to ensure against displacement/misalignment.

FIGS. 4A-4D show assembly steps of the face sensing module 100.

Figure 4A:
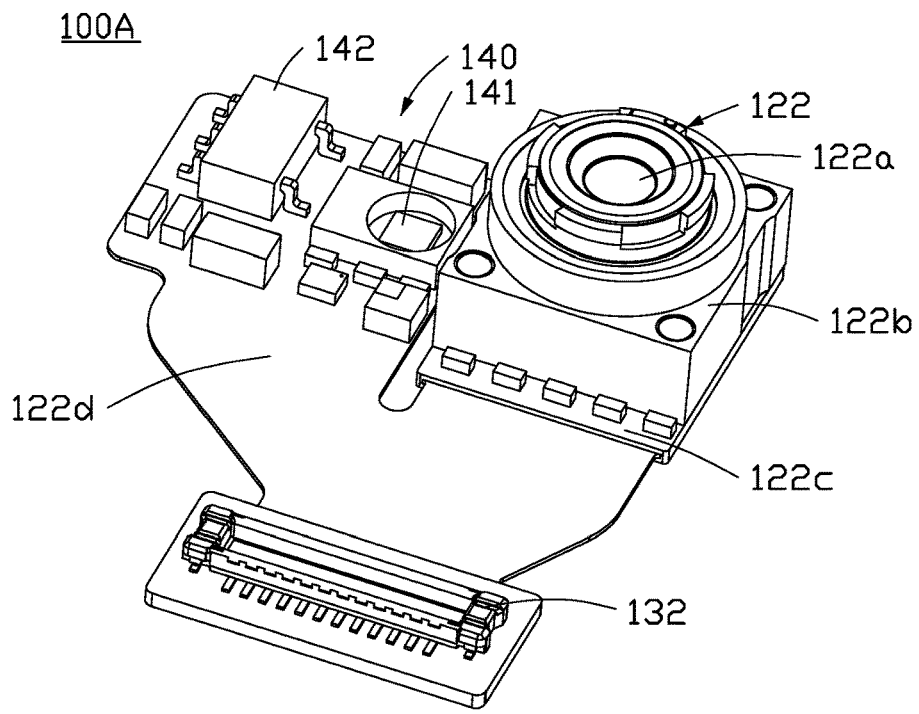
FIGS. 4A-4D are top perspective views of steps of assembly of the face sensing module of FIG. 1A.

In FIG. 4A, the infrared emitter 141 and the infrared controller 142 of the infrared light emitting unit 140 are coupled to the second circuit board 122c of the second infrared camera unit 122, to produce a first semi-finished product 100A.

Figure 4B:
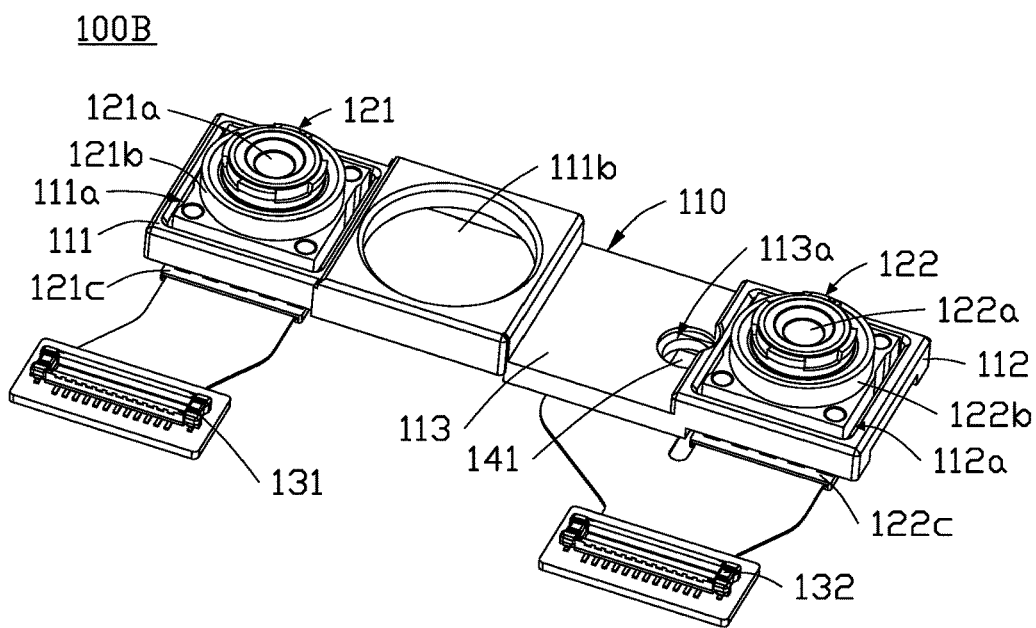

In FIG. 4B, the first semi-finished product 100A and the first infrared camera unit 121 are assembled on the frame 110 such that the first camera mount 121b is received in the first infrared camera receiving opening 111a. The second camera mount 122b is received in the second infrared camera receiving opening 112a, and the infrared emitter 141 corresponds to the light opening 113a. The first infrared camera 121a and the second infrared camera 122a are then optically aligned, and then adhesive used to secure the first infrared camera unit 121 and the second infrared camera unit 122 to the frame 110, to produce a second semi-finished product 100B.

Figure 4C:
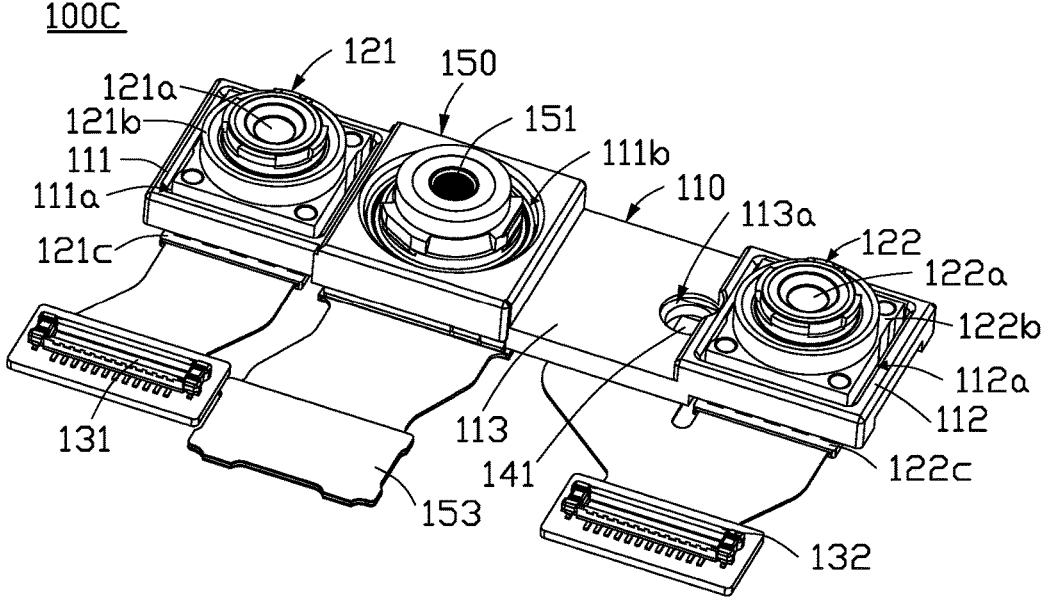

In FIG. 4C, the RGB camera unit 150 is assembled on the second semi-finished product 100B such that the third camera mount 152 is received in the RGB camera receiving opening 111b. The RGB camera 151 is then optically aligned, and then adhesive used to secure the RGB camera unit 150 to the frame 110, to produce a third semi-finished product 100C.

Figure 4D:
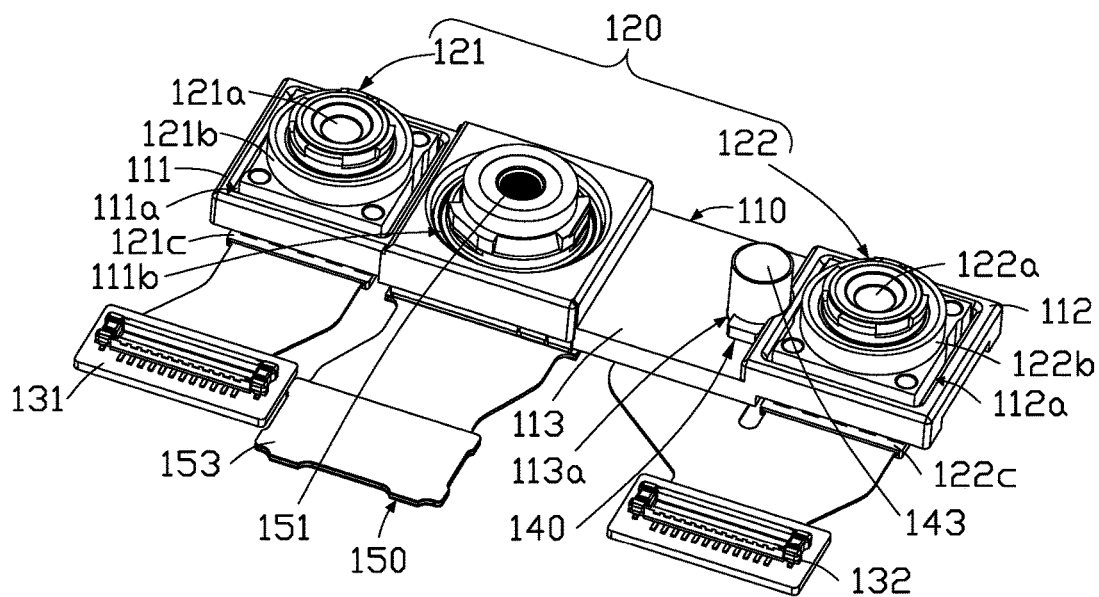

In FIG. 4D, the infrared guide 143 of the infrared light emitting unit 140 is assembled on the third semi-finished product 100C such that the infrared guide 143 corresponds to the infrared emitter 141, thereby completing the assembly.

The embodiments shown and described above are only examples. Many details are often found in this field of art thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A face sensing module comprising:
 a frame comprising:
  a first side portion having a first infrared camera receiving opening and an RGB camera receiving opening;
  a second side portion having a second infrared camera receiving opening; and
  a cross portion having a light opening;
 a depth sensor comprising:
  a first infrared camera unit mounted on the first side portion of the frame, and the first infrared camera unit comprising:
   a first camera mount received in the first infrared camera receiving opening of the first side portion; and
   a first infrared camera secured to the first camera mount;
  a second infrared camera unit mounted on the second side portion of the frame, and the second infrared camera unit comprising:
   a second camera mount received in the second infrared camera receiving opening of the second side portion; and
   a second infrared camera secured to the second camera mount; and
  an infrared light emitting unit mounted on the cross portion of the frame, and the infrared light emitting unit comprising:
   an infrared emitter corresponding to the light opening of the cross portion; and
   an infrared guide covering the light opening of the cross portion; and
 an RGB camera unit mounted on the first side portion of the frame, and the RGB camera unit comprising:
  a third camera mount received in the RGB camera receiving opening of the first side portion; and
  an RGB camera secured to the third camera mount.

2. The face sensing module of claim 1, wherein the first side portion, the cross portion, and the second side portion are positioned in a straight line.

3. The face sensing module of claim 2, wherein the cross portion is recessed.

4. The face sensing module of claim 1,
 wherein the first infrared camera unit further comprises a first circuit board connecting the first infrared camera to a first connector;
 wherein the second infrared camera unit further comprises a second circuit board connecting the second infrared camera to a second connector;
 wherein the infrared emitter is coupled to a side portion of the second circuit board; and wherein the RGB camera unit further comprises a third circuit board connecting the RGB camera to a third connector.

5. The face sensing module of claim 4, wherein the infrared light emitting unit further comprises an infrared controller coupled to the side portion of the second circuit board.

6. The face sensing module of claim 5,
wherein the first connector is located outside of the first side portion;
wherein the second connector is located outside of the second side portion; and
wherein the third connector is located outside of the first side portion.

7. The face sensing module of claim 1, wherein the infrared guide is made of a transparent and flexible material.

8. The face sensing module of claim 1, wherein the infrared guide is columnar.

9. The face sensing module of claim 1, wherein the infrared emitter is an LED device.

10. The face sensing module of claim 1, wherein the frame is made of a rigid material.

11. A computing device comprising:
a housing; and
a face sensing module mounted inside the housing, and the face sensing module comprising:
  a frame comprising:
    a first side portion having a first infrared camera receiving opening and an RGB camera receiving opening;
    a second side portion having a second infrared camera receiving opening; and
    a cross portion having a light opening;
  a depth sensor comprising:
    a first infrared camera unit mounted on the first side portion of the frame, and the first infrared camera unit comprising:
      a first camera mount received in the first infrared camera receiving opening of the first side portion; and
      a first infrared camera secured to the first camera mount;
    a second infrared camera unit mounted on the second side portion of the frame, and the second infrared camera unit comprising:
      a second camera mount received in the second infrared camera receiving opening of the second side portion; and
      a second infrared camera secured to the second camera mount; and
    an infrared light emitting unit mounted on the cross portion of the frame, and the infrared light emitting unit comprising:
      an infrared emitter corresponding to the light opening of the cross portion; and
      an infrared guide covering the light opening of the cross portion; and
  an RGB camera unit mounted on the first side portion of the frame, and the RGB camera unit comprising:
    a third camera mount received in the RGB camera receiving opening of the first side portion; and
    an RGB camera secured to the third camera mount.

12. The computing device of claim 11, wherein the first side portion, the cross portion, and the second side portion are positioned in a straight line.

13. The computing device of claim 12, wherein the cross portion is recessed.

14. The computing device of claim 11,
wherein the first infrared camera unit further comprises a first circuit board connecting the first infrared camera to a first connector;
wherein the second infrared camera unit further comprises a second circuit board connecting the second infrared camera to a second connector;
wherein the infrared emitter is coupled to a side portion of the second circuit board; and
wherein the RGB camera unit further comprises a third circuit board connecting the RGB camera to a third connector.

15. The computing device of claim 14, wherein the infrared light emitting unit further comprises an infrared controller coupled to the side portion of the second circuit board.

16. The computing device of claim 15,
wherein the first connector is located outside of the first side portion;
wherein the second connector is located outside of the second side portion; and
wherein the third connector is located outside of the first side portion.

17. The computing device of claim 11, wherein the infrared guide is made of a transparent and flexible material.

18. The computing device of claim 11, wherein the infrared guide is columnar.

19. The computing device of claim 11, wherein the infrared emitter is an LED device.

20. The computing device of claim 11, wherein the frame is made of a rigid material.

* * * * *